J. BRENZINGER.
CAN HEADING MACHINE.
APPLICATION FILED NOV. 10, 1917.

1,351,831.

Patented Sept. 7, 1920.
7 SHEETS—SHEET 4.

INVENTOR
Julius Brenzinger
BY
ATTORNEY

J. BRENZINGER.
CAN HEADING MACHINE.
APPLICATION FILED NOV. 10, 1917.

1,351,831.

Patented Sept. 7, 1920.
7 SHEETS—SHEET 5.

Fig. 6.

INVENTOR
Julius Brenzinger
BY
ATTORNEY

J. BRENZINGER.
CAN HEADING MACHINE.
APPLICATION FILED NOV. 10, 1917.

1,351,831.

Patented Sept. 7, 1920.
7 SHEETS—SHEET 6.

Inventor:
by Julius Brenzinger
Theo H. Bowusock Atty.

UNITED STATES PATENT OFFICE.

JULIUS BRENZINGER, OF FAIRFIELD, CONNECTICUT, ASSIGNOR TO THE MAX AMS MACHINE COMPANY, OF BRIDGEPORT, CONNECTICUT, A CORPORATION OF NEW YORK.

CAN-HEADING MACHINE.

1,351,831.  Specification of Letters Patent.  Patented Sept. 7, 1920.

Application filed November 10, 1917. Serial No. 201,270.

*To all whom it may concern:*

Be it known that I, JULIUS BRENZINGER, a citizen of the United States, residing at Fairfield, in the county of Fairfield and State of Connecticut, have invented certain new and useful Improvements in Can-Heading Machines, of which the following is a specification.

This invention relates generally to machines for affixing the heads or covers to sheet-metal containers, commonly termed tin cans, by what is known as a double seaming process, with more particular reference to comparatively simple and inexpensive hand-operated machines for this purpose, adapted for use by and within the reach of small packers—the output capacities of whose plants are not sufficiently large to justify the initial and operative costs of the more complicated and expensive automatic machines—or even housewives in the packaging of perishable food products and the like for domestic use.

The principal objects of the present invention are, first, and naturally, the provision of a machine of the simplest and least expensive construction compatible with efficacy, dependability and reasonable output capacity; second, the facilitation of manual operation through novel construction and arrangement of the actuating mechanisms, still keeping in view the highest possible speed consistent with hand feeding and hand operation by a single operative; third, the provision of seaming mechanism which is automatically self-compensatory for irregularities and variations in thickness of the layers of metal to be intercurled by the seaming operation, such as the variation in thickness of the combined layers resulting from the so-called interlocked side seam with which can bodies are now more commonly provided, this type of side seam rendering necessary the intercurling of at least three and sometimes five layers of metal at that point in the top of the can where this side seam terminates, and in this manner minimizing the degree of skill required to be possessed by the operative in adjusting the seaming mechanism and retaining the same in proper adjustment; fourth, the provision of an entirely self-contained and comparatively light machine which may be easily and readily attached to the top of a table or bench and just as easily and readily removed therefrom when not in use; and, fifth, simplifying the actuating connections so far as practicable and otherwise generally improving upon known and approved details of construction and operation to adapt a can heading machine to the uses and for the purposes set forth.

My invention will be readily understood by reference to the accompanying drawings, forming a part of this specification, in which I have illustrated a practical and convenient embodiment thereof, and in which—

Referring now to the drawings in detail, I have shown therein a frame which comprises the vertical rods or posts 11 and 12 and upper and lower cross-bars 13 and 14, respectively, suitably secured thereto. In the upper cross-bar 13 are provided bearings for the sleeve 15 on the vertical and independently rotatable shaft 16, said sleeve being rotatively supported on said cross-bar by the hub 17 of the gear 18 fixed on said sleeve and resting upon the boss 19 on said cross-bar, and said shaft 16 being rotatively supported by the hub 20 of a pinion 21 fixed on said shaft and resting upon the hub 17 of the gear 18. At the upper end of the shaft 16 is fixed a collar 22 carrying the crank-arm 23 at the outer end of which is provided a handle 24, whereby the shaft 16 may be manually rotated.

The rod or post 11 projects upwardly beyond the cross-bar 13, and the upper end thereof provides bearings for the sleeve 25 which is preferably the elongated hub of a pinion 26, the teeth of which are in mesh with the teeth of the gear 18 on the sleeve 15. Fixed on the sleeve or elongated hub 25 is the hub 27 of a gear 28, the teeth of which are in mesh with the teeth of the pinion 21 on the shaft 16. It will be apparent that upon rotation of the shaft 16, the sleeve 15 will be rotated in the same direction—through the pinion 21, the gear 28, the pinion 26 and the gear 18—but at greatly reduced velocity. In fact, the gears and pinions are of such relative pitches as to effect a preferred ratio of velocities of 14:1.

Journaled in the lower cross-bar 14 is the vertical shaft 29, and fixed upon this shaft is a collar 30 having cam surfaces on the lower end thereof adapted to coöperate with complemental cam surfaces on the boss 31 on the cross-bar 14 to raise and lower said shaft 29 upon rotation of said collar 30, in one direction or the other, through the instrumentality of the actuating lever 32 projecting from said collar. This shaft 29 is capped by the rotatable platform 33 with its hub 34, and in order that this rotatable platform 33 may be raised by the shaft 29 under yielding pressure, I provide at the upper end of said shaft a longitudinal bore 35 bridged by a pin 36 which passes through a slot 37 in the upper portion of a cylindrical block 38 in said bore. This block 38 is upwardly pressed by means of a coil-spring 39 in compression between the bottom of said block and the bottom of said bore, and interposed between the top of said block and said platform are preferably two steel balls 40. It will now be apparent that when the shaft 29 is raised through actuation of the lever 32, the platform 33 will be raised therewith but under slightly yielding forces, and said platform be perfectly free to rotate at all times.

Depending from the cross-bar 13 is a collar 41 which carries the disk-plate 42. I provide this disk-plate with three preferably circular orifices 43, 44 and 45. The orifice 45 is bridged by the sliding plate 46, while a sliding plate 47 spans the two orifices 43 and 44. The sleeve 15 terminates at its lower end in a circular head 48 which is eccentric with respect to said sleeve and consequently with respect to its axis of rotation. This eccentric head 48 is located just below the disk-plate 42 and has journaled thereon the disk 49 which has a limited sliding movement against the lower face of the disk-plate 42. The disk 49 is supported for such limited sliding movement by the bolt 50, on one side, which is screwed into said disk and passes through the orifice 45 in the disk plate 42 and through the slidable bridging plate 46, a coil spring 51 being interposed between the plate 46 and the head 52 of the bolt to render this portion of the supporting means of a yielding character for a purpose which will be hereinafter set forth. The other side of the disk 49 is provided with bosses 53 and 60, having bores therethrough which register with the orifices 43 and 44, respectively, in the disk-plate 42, and through these bores and orifices pass bolts 54 and 55, respectively—which bolts also provide axles for the seaming rollers, as will be hereinafter described—this side of the disk 49 being supported from the spanning plate 47, which is engaged by the nuts 56 and 57, by the fixed collars 58 and 59 on said bolts.

In the lower face of the disk-plate 42 is provided a radially disposed slot or groove 61 in which is adapted to travel a small rectangular plate 62 which is centrally apertured for the reception of the round head 63 of a small screw 64 screwed into the upper face of the disk 49. The disk 49 being journaled on the eccentric head 48, and being held against rotation by means of the plate 62 in the slot 61 of the disk-plate 42, it will be apparent that upon rotation of said head 48, what may be termed a combined reciprocatory and oscillatory movement will be imparted to the disk 49. Journaled on the lower ends of the bolt-rods 54 and 55 are the seaming rollers 65 and 66, respectively, so positioned vertically as to be capable of being brought by the disk 49 into coöperative positional relation to the chuck 67 at the lower end of the shaft 16 to perform the seaming operation in the usual manner. These seaming rollers are each of common and well-known contour, one thereof being adapted to start and the other to complete the seaming operation. What I have termed the combined reciprocatory and oscillatory movement of the disk 49 is such that from a position in which both of said rollers are free and clear of the chuck-supported can head, first one and then the other of said rollers are brought into coöperative positional relationship to the chuck to start and complete the seaming operation. This movement of the disk 49 is clearly shown, described and explained in a prior Patent No. 1,167,346, taken in connection with another prior Patent No. 1,167,347, both granted to me on January 4, 1916, and therefore need not be made the subject of further description in this specification. In fact, the specific construction and operation of the seaming mechanism is not of the essence of the present invention.

Figure 1:
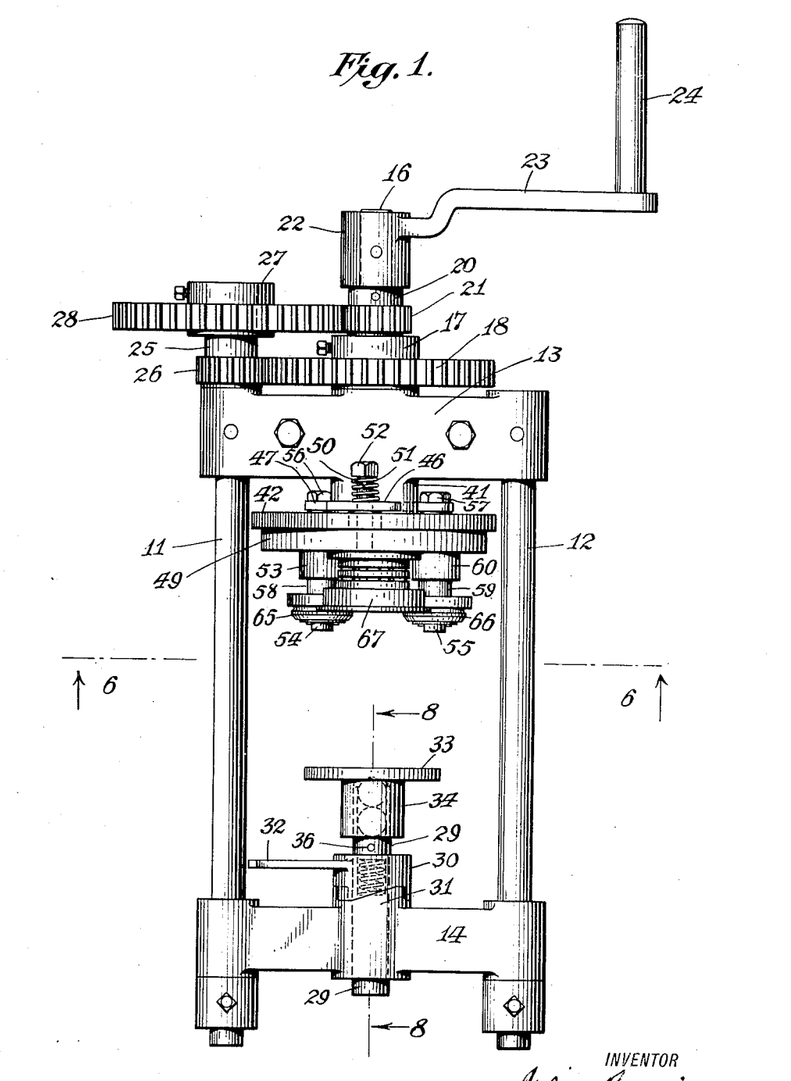
Figure 1 is a front elevation of a can heading machine embodying the invention.
Figure 2:
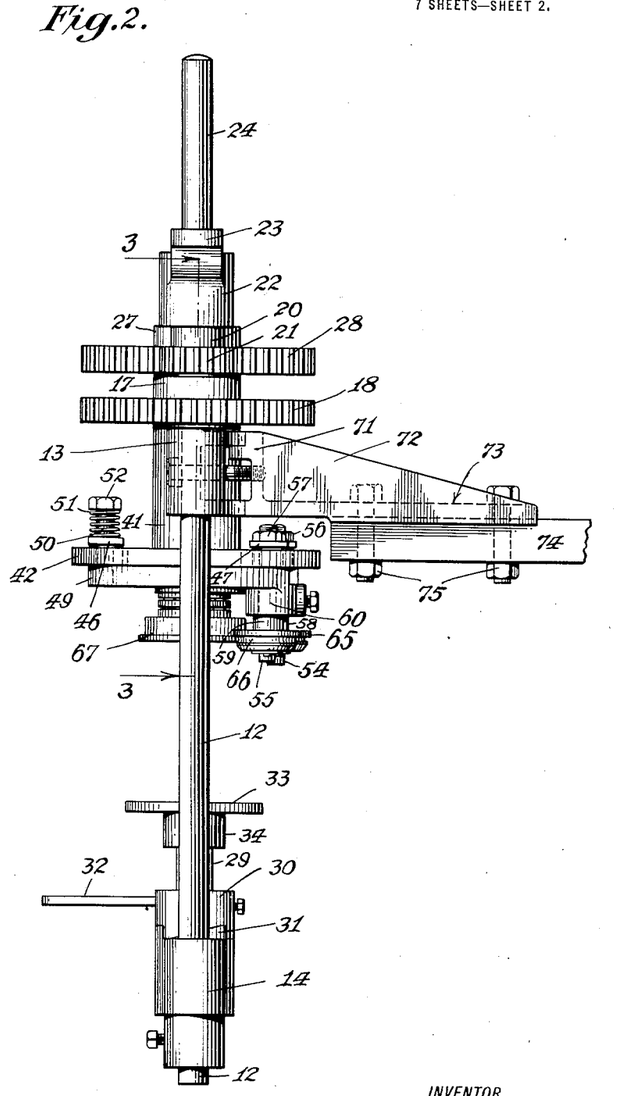
Fig. 2 is a side elevation thereof.

It may be assumed that when the parts are in the relative positions indicated in Figs.

Figure 3:
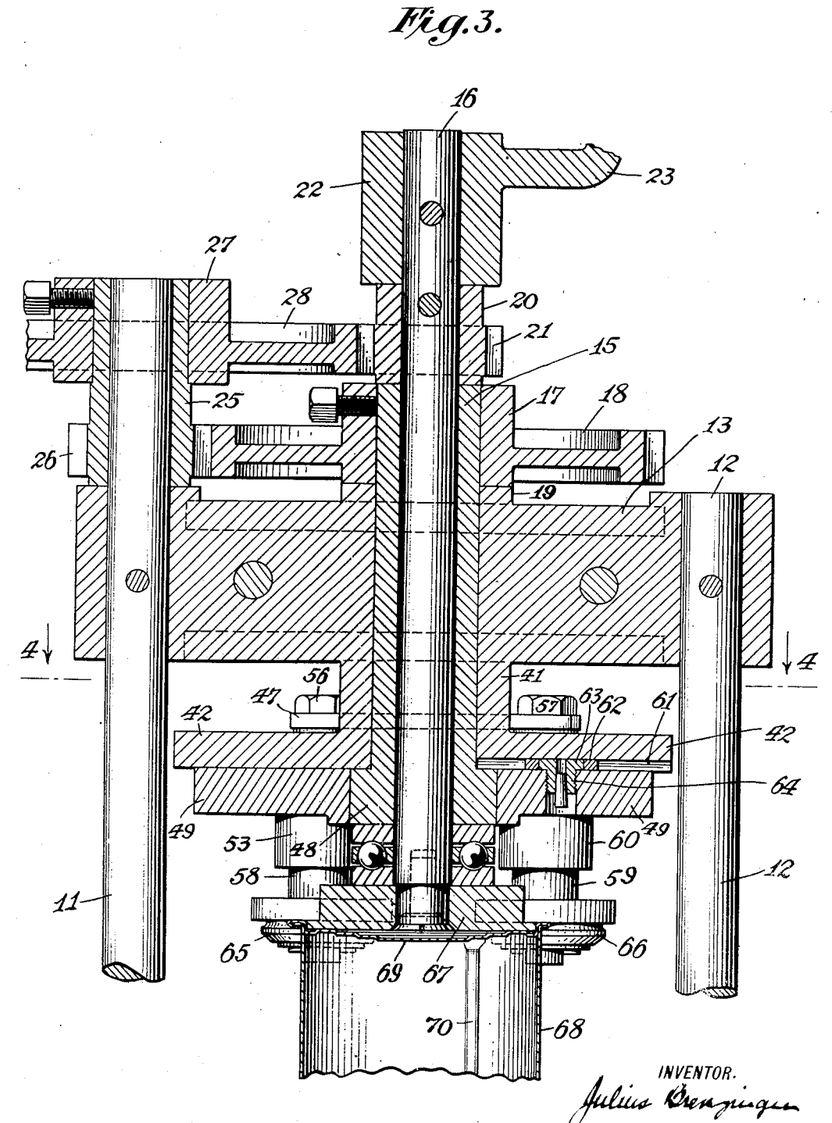
Fig. 3 is an enlarged fragmentary section taken substantially on the line 3—3 of Fig. 2.
Figure 4:
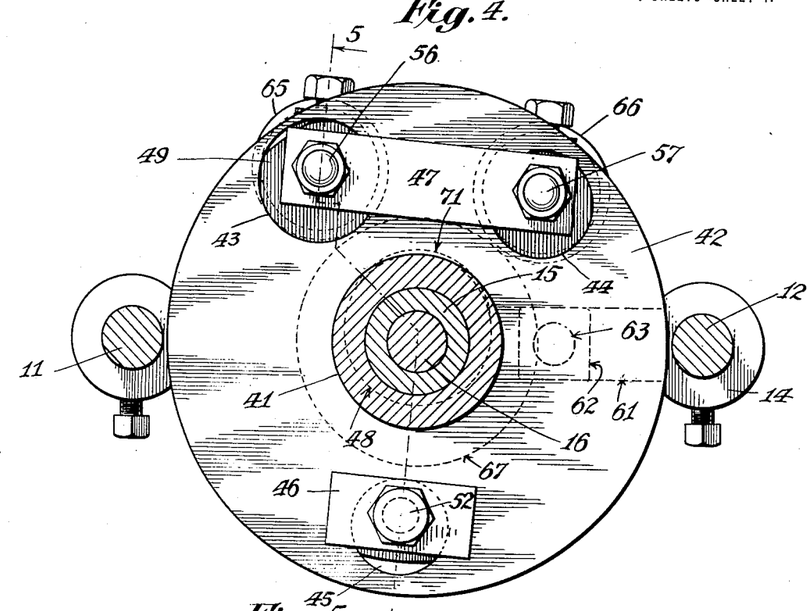
Fig. 4 is a horizontal section taken substantially on the line 4—4 of Fig. 3.
Figure 5:
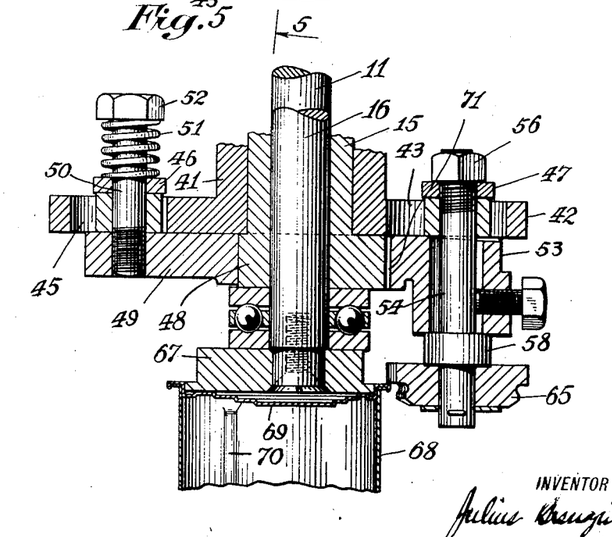
Fig. 5 is a section taken substantially on the broken line 5—5 of Fig. 4.
Figure 6:
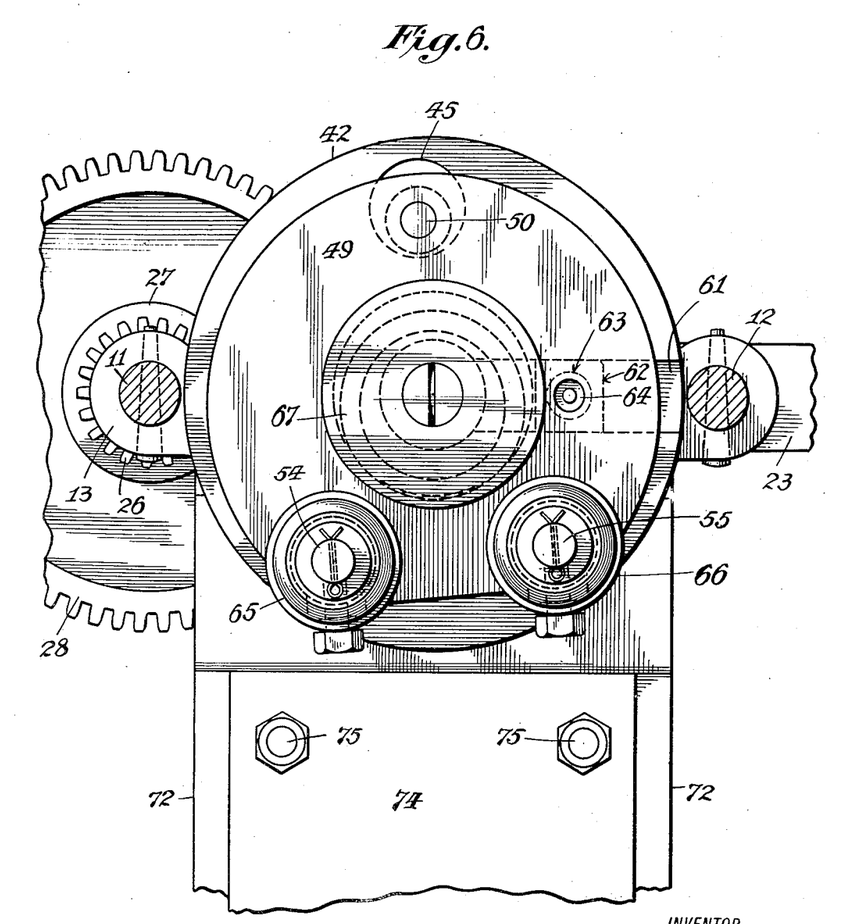
Fig. 6 is an enlarged inverted section taken substantially on the line 6—6 of Fig. 1, showing a bottom plan view of the seaming mechanism.

1 and 2, the platform 33 is in its lowermost position and the seaming rollers 65 and 66 in what may be termed their outermost positions—that is to say, removed from the chuck 67 to permit of the positioning of the assembled can parts thereagainst. The operator places the can to be headed, with the head positioned thereon, on the platform 33, then through the actuating lever 32 raises said platform in the manner hereinbefore described, whereby the assembled can parts are yieldingly pressed against the chuck 67, as shown in Figs. 5 and 3, wherein numeral 68 designates the can body and 69 the superposed can head or cover. Now, upon rotation of the shaft 16 by means of the handle 24 on the arm 23, the assembled can parts will be rotated with the chuck 67, while at the same time the combined reciprocatory and oscillatory movement will be imparted to the disk 49 to perform the seaming operation in the manner set forth. After the can has been headed and the seaming rollers returned to initial positions—requiring, as stated, preferably fourteen turns of the handle 24—the lever 32 is returned to its initial position, thereby lowering the platform 33 for removal of the headed can and the positioning of the next succeeding can to be headed for a repetition of the described operations.

Figure 7:
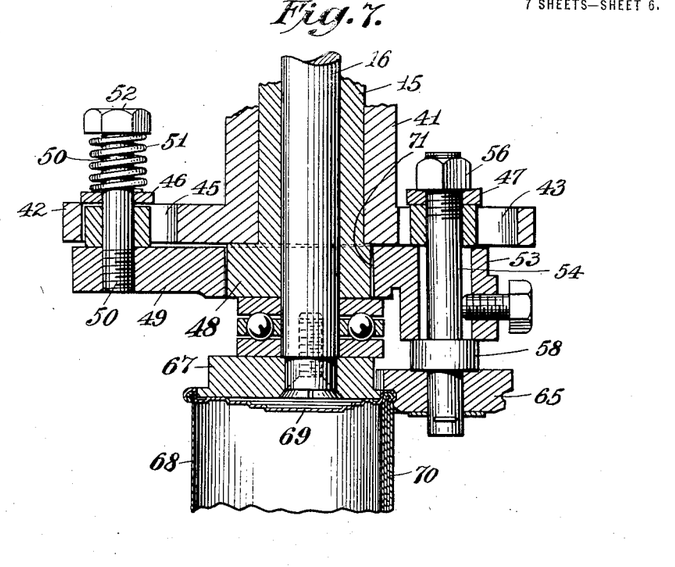
Fig. 7 is a view similar to Fig. 5, with parts in slightly different positions of adjustment, as hereinafter described in detail, illustrating the self-compensatory feature of the seaming mechanism to which I have hereinbefore referred.
Figure 8:
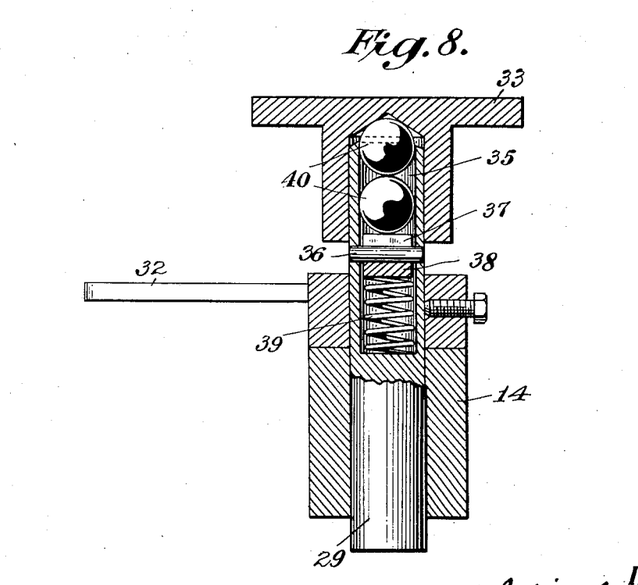
Fig. 8 is an enlarged section taken substantially on the line 8—8 of Fig. 1.

I have hereinbefore referred to the fact that provision may be made—and should be made in a machine of this character designed to permit of its being successfully operated by an unskilled or a moderately skilled operative—in the seaming mechanism for automatically compensating for irregularities and variations in combined thickness of the layers of metal to be intercurled by the seaming operation. These irregularities and variations are sometimes so marked that substantial rigidity of parts and connections would result either in an imperfect seam or a fatal distortion of one or more of said parts or connections. For example, as has been hereinbefore suggested, so-called "sanitary" or solderless cans, under present methods of construction, have what is termed an interlocked side seam which is sometimes extended throughout the length of the can body and is sometimes terminated at points short of the can ends whereby those portions of the metal layers to be intercurled are merely overlapped, but under any conditions increasing the number of layers to be intercurled by at least one, and sometimes three. It will be apparent that if the seaming rollers are so adjusted that they properly intercurl and compress two layers of metal, unless such adjustment is made with a high degree of skill, each roller, when it reaches the side seam 70 of the can body, will either fail to perform its proper function or be deflected to the point of permanent distortion of its supporting or actuating means. It is not to be expected that machines of the type herein shown and described will at all times and under all circumstances be operated by skilled mechanics, capable of adjusting the seaming mechanism to such a degree of nicety as to insure substantially perfect seaming operations under all conditions with substantially rigid connections between the parts. Therefore, in journaling the disk 49 on the eccentric head 48, I so dimension the parts as to provide a certain amount of "play," as clearly shown in Figs. 5 and 7, the diameter of the eccentric head 48 being appreciably less than that of the containing orifice in the disk 49, and chamfer the upper face of the disk 49 on the side thereof whereon are located the bosses 53 and 60, whereby said disk may be given a slight oscillatory movement against the action of the spring 51 under conditions such as illustrated in Fig. 7, wherein I have shown the roller 65 passing over the end of the side seam 70 of the can body 68. It will be seen, therefore, that the seaming mechanism of the present invention, through the action of the spring 51, is automatically self-compensatory for any and all irregularities and variations in thickness in the combined layers of metal to be intercurled.

Suitably secured to the rear side of the cross-bar 13 and projecting rearwardly therefrom is a frame which preferably comprises the vertical wing 71, the side braces 72 72 and the bottom plate 73, the latter being adapted to be secured to a table or bench top 74 by bolts 75 75, as shown in Fig. 2, whereby the machine may be readily mounted for operation thereof when desired, and just as readily dismounted and placed to one side, out of the way, when not in use.

Figure 9:
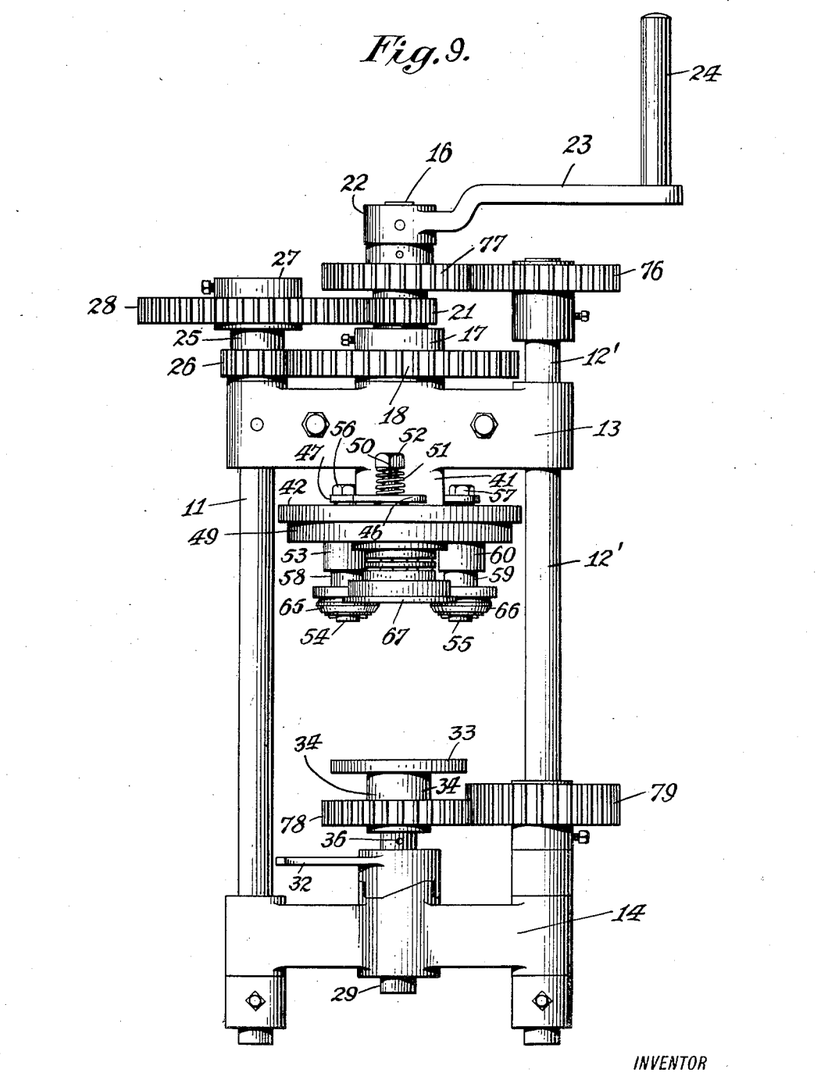
Fig. 9 is a view similar to Fig. 1, illustrating a modification of the preferred construction of the machine.

Under ordinary conditions, I have found that the yielding forces exerted by the raised platform 33, through the can body and against the chuck 67, are sufficient to insure rotation of the assembled can parts with said chuck upon rotation of the shaft 16 by the handle 24 on the arm 23. However, it might be desirable, under certain conditions, to positively rotate the platform 33 synchronously with respect to the chuck 67, and this may readily be accomplished in the manner indicated in Fig. 9, wherein I have shown the rod 12′, corresponding to the rod 12 in the preferred construction, rotatable in bearings in the cross-bars 13 and 14, instead of being fixed therein as illustrated in Figs. 1 and 2, and projecting upwardly beyond the cross-bar 13. At the upper end of the rod 12′, which now constitutes a vertical shaft, is fixed a gear 76 the teeth of which are in mesh with the teeth of a gear 77 fixed on the shaft 16. The collar or sleeve 34, which carries the platform 33, is provided with a gear 78, the teeth of which are in mesh with the teeth of a gear 79 fixed to the rod or shaft 12' near the lower end of the latter, and it will be apparent that these gears 77, 76, 79 and 78 being of equal pitch, the platform 33 will be positively rotated with the chuck 67 upon rotation of the shaft 16.

Many modifications of minor details of my improved manually operated can heading machine will doubtless readily suggest themselves to those skilled in the art to which it appertains, and I therefore do not desire to limit my invention to the specific construction herein shown and described.

I claim as new and desire to secure by Letters Patent:

1. In a can heading machine, the combination, with a frame comprising vertical posts and upper and lower cross-pieces, said upper cross-piece carrying seaming mechanism which comprises a can-head supporting chuck, a vertical shaft at the lower end of which said chuck is mounted, a seaming-roller carrier and seaming rollers mounted thereon, a sleeve on said shaft, and means intermediate said sleeve and said carrier for actuating the latter upon rotation of the former to successively advance and retract said rollers to and from effectively coöperative positional relation to said chuck, of a member mounted for rotation about a vertical axis, a pinion on said shaft meshing with a gear on said member and a pinion on said member meshing with a gear on said sleeve, whereby said shaft and said sleeve will be rotated at different velocities upon rotation of any one of the intergeared elements.

2. In a can heading machine, the combination, with a frame comprising vertical posts and upper and lower cross-pieces, one of said posts having an extension above the upper cross-piece, said upper cross-piece carrying seaming mechanism which comprises a can-head supporting chuck, a vertical shaft at the lower end of which said chuck is mounted, a seaming-roller carrier and seaming rollers mounted thereon, a sleeve on said shaft, and means intermediate said sleeve and said carrier for actuating the latter upon rotation of the former to successively advance and retract said rollers to and from effectively coöperative positional relation to said chuck, of a member mounted for rotation on said post-extension, a pinion on said shaft meshing with a gear on said member and a pinion on said member meshing with a gear on said sleeve, whereby said shaft and said sleeve will be rotated at different velocities upon rotation of any one of the intergeared elements.

3. In a can heading machine, the combination, with a frame comprising vertical posts and upper and lower cross-pieces, said upper cross-piece carrying seaming mechanism which comprises a can-head supporting chuck, a vertical shaft at the lower end of which said chuck is mounted, means for rotating said shaft, a sleeve rotatable on said shaft, a seaming-roller carrier having seaming rollers mounted thereon, and means intermediate said sleeve and said carrier for actuating the latter upon rotation of the former to successively advance and retract said rollers to and from effectively coöperative positional relation to said chuck, of a member mounted for rotation about a vertical axis, and a pinion on said shaft meshing with a gear on said member and a pinion on said member meshing with a gear on said sleeve, whereby said sleeve will be rotated at reduced velocity upon rotation of said shaft.

4. In a can heading machine, the combination, with a frame comprising vertical posts and upper and lower cross-pieces, one of said posts having an extension above the upper cross-piece, said upper cross-piece carrying seaming mechanism which comprises a can-head supporting chuck, a vertical shaft at the lower end of which said chuck is mounted, means for rotating said shaft, a sleeve rotatable on said shaft, a seaming-roller carrier having seaming rollers mounted thereon, and means intermediate said sleeve and said carrier for actuating the latter upon rotation of the former to successively advance and retract said rollers to and from effectively coöperative positional relation to said chuck, of a member mounted for rotation on said post-extension, a pinion on said shaft meshing with a gear on said member, and a pinion on said member meshing with a gear on said sleeve, whereby said sleeve will be rotated at reduced velocity upon rotation of said shaft.

5. In a can heading machine, the combination, with a frame comprising vertical posts and upper and lower cross-pieces, said upper cross-piece carrying seaming mechanism which comprises a can-head supporting chuck, a vertical shaft at the lower end of which said chuck is mounted, means for rotating said shaft, a sleeve rotatable on said shaft, a seaming-roller carrier and seaming rollers mounted thereon, and means intermediate said sleeve and said carrier for actuating the latter upon rotation of the former to successively advance and retract said rollers to and from effectively coöperative positional relation to the chuck-supported can parts, and said lower cross-piece carrying a vertically reciprocable and rotatable platform for receiving the assembled can parts and raising the same to engagement with said chuck and manually operable means for reciprocating said platform, of a member mounted for rotation about a vertical axis, a pinion on said shaft meshing with a gear on said member, and a pinion on said member meshing with a gear on said sleeve, whereby said sleeve will be rotated at reduced velocity upon rotation of said shaft.

6. In a machine of the character described, the combination, with the chuck and the chuck-carrying shaft, of a seaming-roller carrier, means for supporting said carrier for lateral movement relative to said chuck, seaming rollers mounted on said carrier on the same side of said chuck and chuck-shaft, and means for actuating said carrier to bring said rollers successively and intermittently into effectively coöperative positional relation to said chuck to perform the seaming operation, said carrier supporting and actuating means being of a yielding character whereby said rollers are pressed against the chuck-supported work under yielding forces.

7. In a machine of the character described, the combination, with the chuck and the chuck-carrying shaft, of a seaming-roller carrier, a plate against the lower face of which said carrier is slidably supported, seaming rollers mounted on said carrier on the same side of said chuck and chuck-shaft, and means for actuating said carrier to bring said rollers successively and intermittently into effectively coöperative positional relation to said chuck to perform the seaming operation, the connections between said carrier and said plate being of a yielding character whereby said rollers are pressed against the chuck-supported work under yielding forces.

8. In a machine of the character described, the combination, with the chuck and the chuck-carrying shaft, of a seaming-roller carrier, a plate against the lower face of which said carrier is slidably supported, seaming rollers mounted on said carrier on the same side of said chuck and chuck-shaft, and means for actuating said carrier to bring said rollers successively and intermittently into effectively coöperative positional relation to said chuck to perform the seaming operation, the connections between said plate and said carrier including a spring against the action of which said carrier and rollers may be oscillated, whereby said rollers are pressed against the chuck-supported work under yielding forces.

9. In a machine of the character described, the combination, with the chuck and the chuck-carrying shaft, of a seaming-roller carrier, a plate against the lower face of which said carrier is slidably supported, seaming rollers mounted on said carrier on the same side of said chuck and chuck-shaft, and means for actuating said carrier to bring said rollers successively and intermittently into effectively coöperative positional relation to said chuck to perform the seaming operation, the connections between said plate and said carrier including a spring and one of said members having a reduced portion on the side thereof opposite said spring whereby said carrier and rollers may be oscillated against the action of said spring and said rollers thereby pressed against the chuck-supported work under yielding forces.

10. In a machine of the character described, the combination, with the chuck and chuck-carrying shaft, of a seaming-roller carrier, a plate against the lower face of which said carrier is slidably supported, seaming rollers mounted on said carrier on the same side of said chuck and chuck-shaft, and means for actuating said carrier to bring said rollers successively and intermittently into effectively coöperative positional relation to said chuck to perform the seaming operation, the connections between said plate and said carrier including a spring and said carrier being chamfered on the side thereof opposite said spring whereby said carrier and said rollers may be oscillated against the action of said spring and said rollers thereby pressed against the chuck-supported work under yielding forces.

In testimony of the foregoing, I have hereunto set my hand in the presence of two witnesses.

JULIUS BRENZINGER.

Witnesses:
I. H. MacBride,
Timothy A. Eigo.